(12) United States Patent
Kenton

(10) Patent No.: X6040
(45) Date of Patent: Jun. 21, 1830

(54) SILVERING & GILDING LEATHER

(76) Inventor: Levi Kenton

Levi Kenton of Philadelphia Pennsylvania

Letters Patent.

The Schedule referred to in these Letters Patent and making part of the same containing a description in the words of the said Levi Kenton himself of his Improvement in the art of Silvering and Gilding Leather

To all to whom these presents shall come. Be it Known that I Levi Kenton of the City of Philadelphia and State of Pennsylvania. have invented a new and useful improvement in the art of silvering and gilding Leather. and that the following is a full and exact description of the Process and composition of matter employed therein as invented by me. The composition of matter or size rendering the leaf adhesive is thus prepared: Reduce half a pound of Ivory turnings (fish glue or isinglass) added to two quarts of water, to one pint by boiling. Thus reduced the composition is strained through linen or muslin: and a single coat is laid on the leather with a sponge and dried. or instead of this composition lay on two coats of the whites of eggs. and dry it in the same manner. The leather is then softened by a coat of tallow mixed with sweet oil. The gold or silver leaf is then laid on out of the Book or with the ordinary tip used by Gilders. It is then run or passed through two rollers. fashioned according to the shape intended for the leather. and heated as they usually are for the purpose of embossing leather. after running it through the rollers, the loose leaf is removed by wiping it with a cotton Rag. It is then carefully rubbed with a silk handkerchief taking care not to injure the impression. This imparts a gloss to the coloured portion of the leather and completes the process. The leather may be of Goat. Sheep, or Calf Skin. & of any colour cut previously to any required size. If fish glue or Isinglass be used in lieu of Ivory turnings one ounce of either dissolved by simmering it in a pint of water is sufficient Levi Kenton Exd.
[illegible]

Witnesses
S Badger
G. Newman.

374 words]